United States Patent [19]

Hassel

[11] Patent Number: 5,257,758
[45] Date of Patent: Nov. 2, 1993

[54] REVERSING PANEL STORES CARRIER

[75] Inventor: Richard O. Hassel, San Jose, Calif.

[73] Assignee: Westinghouse Electric Corp., Pittsburgh, Pa.

[21] Appl. No.: 910,853

[22] Filed: Jul. 6, 1992

[51] Int. Cl.$^5$ .............................................. B64D 7/08
[52] U.S. Cl. .............................. 244/137.4; 244/129.4; 312/29; 89/1.58
[58] Field of Search .............. 244/137.1, 137.4, 118.1, 244/129.4, 129.5, 130; 312/22, 25, 28, 29; 89/1.54, 1.57, 1.58, 1.59, 1.801, 1.802, 1.804, 1.815

[56] References Cited

U.S. PATENT DOCUMENTS

| | | | |
|---|---|---|---|
| 139,805 | 6/1873 | Morrison | 312/22 |
| 2,398,696 | 4/1946 | Colegrove | 312/28 |
| 2,921,501 | 1/1960 | Parot | 89/1.5 |
| 2,927,533 | 8/1960 | Brumby et al. | 268/30 |
| 4,089,572 | 5/1978 | Flynt et al. | 312/22 |
| 4,620,753 | 11/1986 | Ogden | 312/29 |
| 4,781,342 | 11/1988 | Hardy et al. | 244/137.4 |

FOREIGN PATENT DOCUMENTS 877448 9/1961 United Kingdom ............. 244/137.4

Primary Examiner—Galen Barefoot
Attorney, Agent, or Firm—D. Schron

[57] ABSTRACT

A reversing panel assembly utilizable in an aircraft for the carriage and deployment of stores is disclosed. The panel has two pivot axes. The first pivot axis extends through the center of the panel, and the second pivot axis is parallel to the first and extends through a distal portion of the panel. A first and second cam follower are mounted on the first and second pivot axes, respectively, at each end of the panel. The first cam follower is movable laterally along a first guide track which is substantially parallel to the surface of the aircraft. The first cam follower is movable between a first position and a second position on the first guide track. The first position is centrally located relative to the opening, and the second position is distally located relative to the opening. The second cam follower is movable along a second guide track which extends into the stores bay around the first guide track from one end of the opening to the other end of the opening in a lateral plane which is perpendicular to the surface of the aircraft. In this way, the first and second cam followers can be operated in combination to cause the panel and store to rotate one hundred and eighty degrees about the first axis.

15 Claims, 3 Drawing Sheets

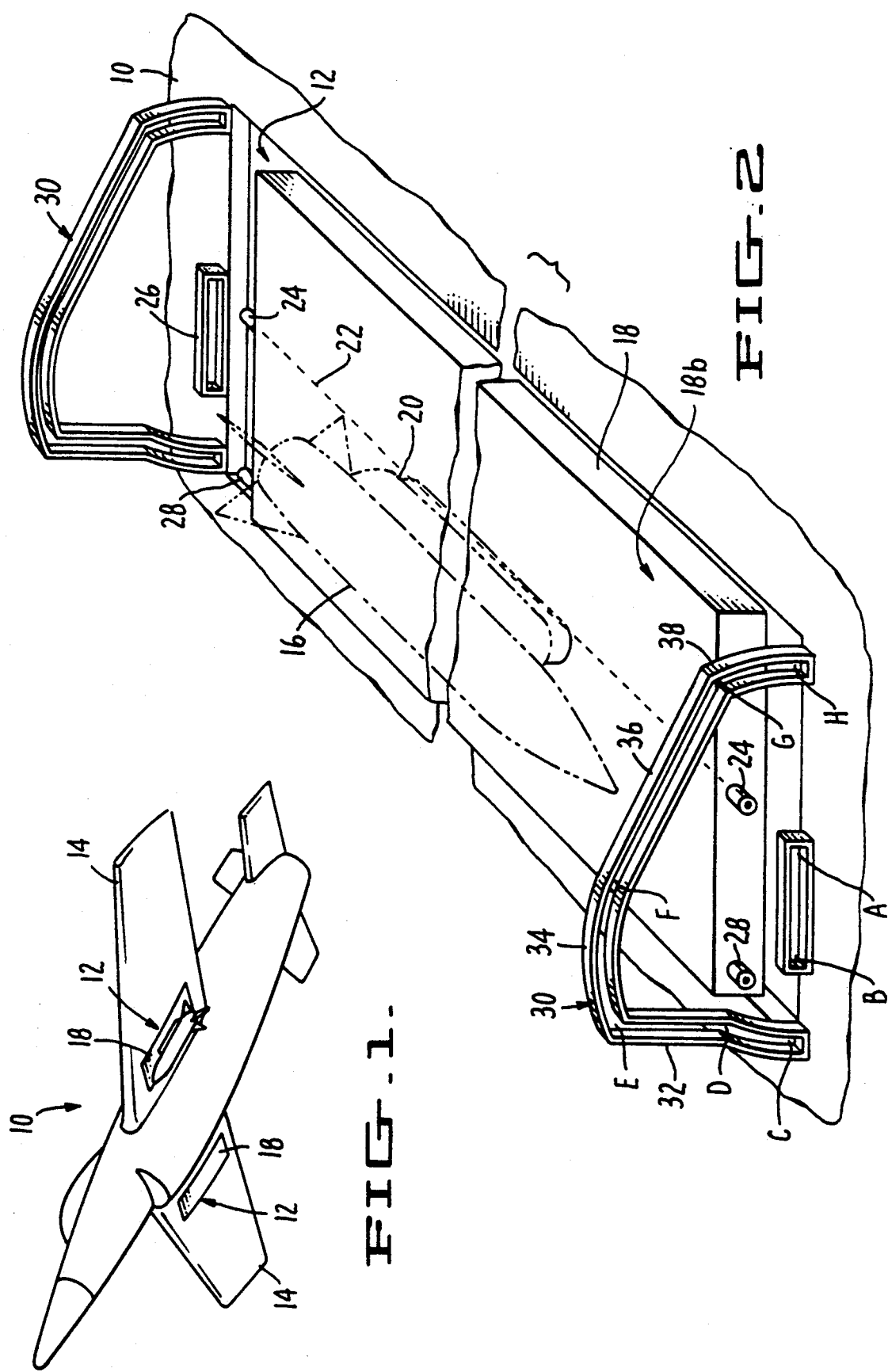

REVERSING PANEL STORES CARRIER

BACKGROUND

1. Field of the Invention

This invention relates to reversible panels, and more particularly to a reversing panel utilizable for the carriage and deployment of stores from aircraft.

2. Description of the Prior Art

The carriage and deployment of stores on aircraft presents logistical and aerodynamic challenges that continue to evolve with each new generation of advanced military aircraft and stores. Various designs have attempted to efficiently deploy stores into a launch position while minimizing the loss of aerodynamic profile caused by such deployment and by the stores themselves. For example, in U.S. Pat. No. 2,921,501 to Parot, stores are deployed on a movable panel. To launch the stores, a primary panel in the skin of the aircraft is moved to the side and the stores panel is moved into its place in the skin of the aircraft. In U.S. Pat. No. 2,947,533 to Brumbry et al., a panel having stores thereon is rotated using a gear arrangement to change from the stores position to the launch position. In U.S. Pat. No. 4,781,342 to Hardy et al., weapons are stored in aerodynamic recesses to facilitate carrying different types of weapons in an efficient manner.

None of those references adequately addresses all of the problems of balancing the need for flexibility in stores deployment with obtaining a minimum negative aerodynamic impact and maintaining airframe structural integrity. It remains desirable to have a system for stores deployment that is fast, flexible, aerodynamic and minimizes structural loads on the aircraft.

SUMMARY OF THE INVENTION

The present invention is a reversing panel assembly utilizable in aircraft for the carriage and deployment of stores. A panel is adapted to fit an opening in the surface of the aircraft and present a minimum of aerodynamic drag in either the store or launch position. Typically, a launcher is affixed to the panel for carriage and deployment of stores.

The panel has two pivot axes. A first pivot axis extends through the center of the panel, and a second pivot axis is parallel to the first and extends through a distal portion of the panel. A first and second cam follower are mounted on the first and second pivot axes, respectively, at each end of the panel.

The first cam follower is movable laterally along a first guide track which is substantially parallel to the surface of the aircraft. The first cam follower is movable between a first position and a second position on the first guide track. The first position is centrally located relative to the opening, and the second position is distally located relative to the opening.

The second cam follower is movable along a second guide track which extends into the stores bay around the first guide track from one end of the opening to the other end of the opening in a lateral plane which is perpendicular to the surface of the aircraft. In this way, the first and second cam followers can be operated in combination to cause the panel and store to rotate one hundred and eighty degrees about the first axis.

BRIEF DESCRIPTION OF THE DRAWINGS

FIG. 1 is a schematic diagram of a combat aircraft having reversing stores panels in accordance with the present invention.

FIG. 2 is a perspective view of the reversing panel.

DETAILED DESCRIPTION OF THE INVENTION

Figure 3:
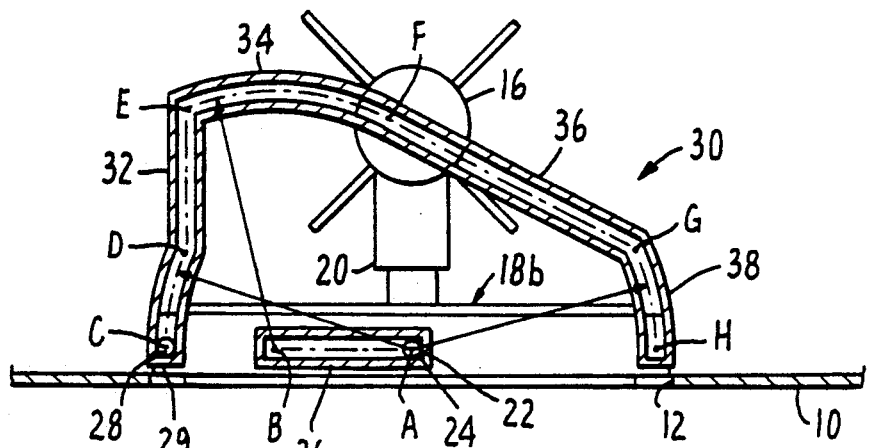
FIGS. 3-8 are side plan views of a reversing panel according to the present invention, illustrating various stages of the operation of the panel.

The present invention provides structural panels which reverse, or flip-flop, and which may be utilized, for example, on combat aircraft for the carriage and deployment of stores. As illustrated in FIG. 1, a combat aircraft 10 has sites or openings 12 under the wing sections 14 through which missiles or other stores may be deployed. It should be recognized that other aircraft and other deployment sites, such as along the fuselage, are possible, and the geometry described hereinafter is intended to be illustrative only. Panels 18 are adapted to fit into the openings 12, and missiles or stores are normally carried on the inboard surface of panel 18. For deployment, the panels 18 are inverted as described below, the stores launched, and the panel reinverted to the carriage position.

The openings 12 may be sized to correspond to the type of stores deployed. For example, many of the United States arsenal of air-to-air missiles (AAM), including the AMRAAM (advanced medium range air-to-air missile) and the Sparrow missile are approximately twelve feet in length with seven to eight inch diameters and up to a forty inch wing or fin span. It is, of course, desirable to have the flexibility to deploy different types of stores. Thus, while it is preferable to design and incorporate the reversing panels 18 of the present invention during construction of the combat aircraft, it is recognized that changes in store geometries may require retrofitting an existing aircraft to install or modify the reversing panels openings 12 and/or the panels 18.

Referring now to FIG. 2, the width of openings 12 will be determined by reference to the combined size of the panel 18, launcher 20, and missile 16, which as a unit, must be capable of rotating through the opening 12. The launcher assembly 20 is rigidly mounted to the panel 18, but may be removed and replaced with other launchers as required. For example, an AMRAAM missile and its launcher assembly will extend nearly twenty-four inches from the outboard surface 18a of the panel 18. The thickness of the panel 18 will depend on the location of the deployment site, since panels on the fuselage will have curved surfaces, whereas under-wing sites, as illustrated in FIG. 1, will have essentially flat surfaces. Thus, for purposes of the present illustration, an opening 12 sized approximately twelve and one-half feet long by thirty-two inches wide would be sufficient where an AMRAAM missile is specified.

The panel 18 is constructed such that the outboard surface 18a and the inboard surface 18b are virtually identical, except for the launcher 20 which is mounted on the inboard surface 18b, such that a low drag aerodynamic profile is presented by the panel 18 in either the carriage or the launch position. In either of the end-of-travel positions, the panel 18 is held in position by latches along both of its sides and can be sealed, if required, by an inflatable seal around the perimeter of the opening 12. Due to the path taken by the panel 18 during operation, both the panel 18 and the aircraft can maintain their full structural thickness up to the perimeter of the opening 12. This allows utilization of the panel 18 as a part of the fuselage structure when latched in either the stored or deployed position.

The panel 18 is rotatable about a first or central longitudinal axis 22. A first pair of cam rollers 24 are attached in axial positions on opposite ends of the panel 18. The cam rollers 24 permit the central axis to be moved laterally along a first guide track 26 which is affixed to the aircraft 10. The first guide track is preferably a pair of identical and opposing slots cut into the inside edges of the narrower sides of opening 12. The lateral translation of the central axis permits the panel 18 to be inverted in a narrower width than would otherwise be possible. Thus, the central axis will be moveable between a first or central position, designated as point A on FIG. 3, and a second or off-center position, designated as point B on FIG. 3.

A second pair of cam rollers 28 are attached on opposite ends of a second or distal axis 29 near one side of the panel 18. A second guide track 30 is affixed to the aircraft 10 for providing a path for the second cam rollers 28 to rotate one end of the panel 18 about the central axis 22 in order to invert the orientation of the panel. The second guide track 30 is preferably a pair of slotted tracks affixed on the inboard side of the edges and extending along a non-linear path from one side of the opening 12 to the other side of the opening 12 as shown in FIG. 3.

Each of the slotted tracks for the second guide track 30 includes five sections which define the non-linear path of travel for the second cam rollers 28. A first section 31 follows an arc centered on point A from point C to point D. This allows the panel 18 to rotate until the lateral edges of the panel 18 and the opening 12 are clear of one another. A second section 32 is essentially perpendicular to the plane of the opening 12 and extends from point D to point E, which, for the AMRAAM geometry defined above, is located sixteen inches inboard of the surface. A third section 34 traces a forty degree arc from point E to point F about point B. A fourth section 36 from point F to point G traces the tangent to the arc of the second section 34 at point F. A fifth section 38 traces an arc from point G to point H about point A, and connects the fourth section 36 back to the surface of the aircraft.

Figure 4:
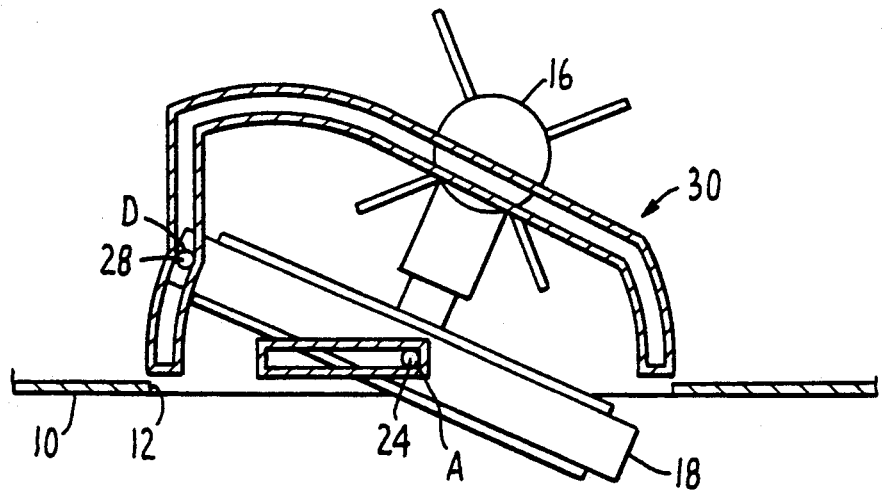
Figure 5:
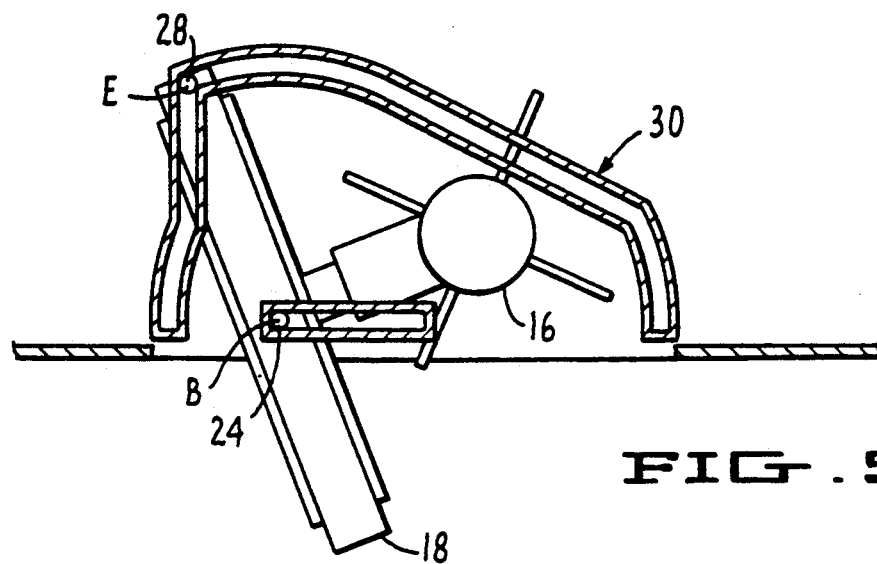
Figure 6:
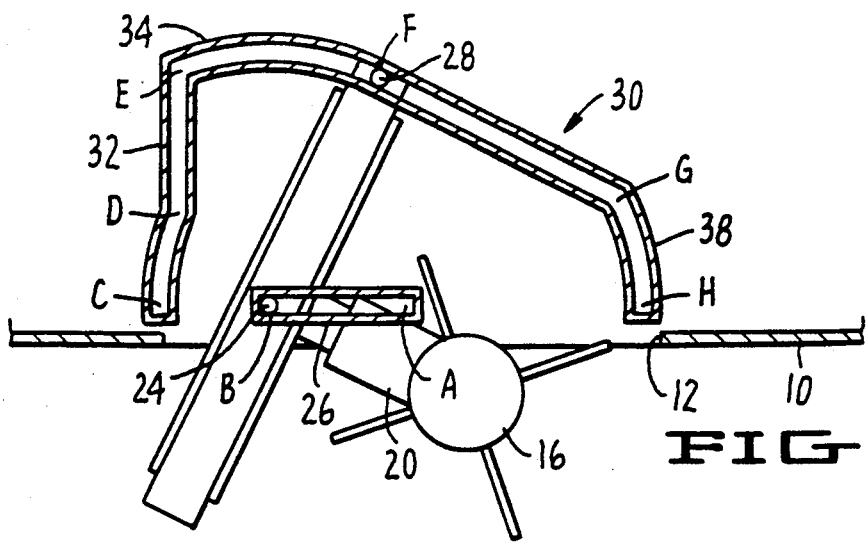
Figure 7:
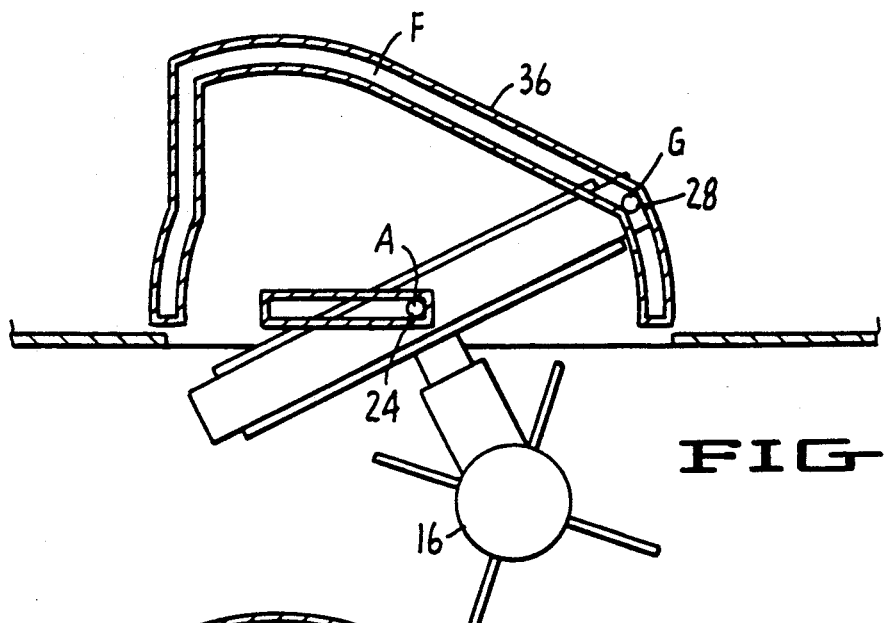
Figure 8:
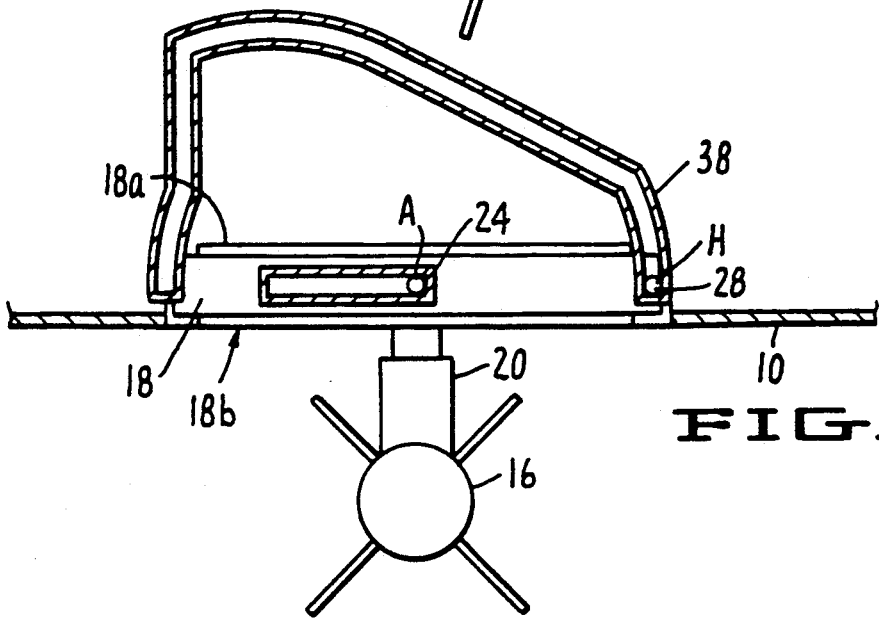

Operation of the panel assembly is illustrated sequentially in FIGS. 3-8, where the panel 18 is rotated from the carriage or closed position (FIG. 3) to the launch or open position (FIG. 8). In the closed position, see FIG. 3, the central axis 22 is at point A on the first guide track 26, and the distal axis 29 is at point C on the second guide track 30. In FIG. 4, the latches have been released and the rollers 28 have been moved along section 31 of guide track 30 to position D, rotating the panel around point A. Means for moving the rollers 24, 28 along the guide tracks 26, 30 are fully conventional, and may include any type of electromechanical or hydromechanical drive system. Either method of powering the system can be used in combination with position sensors and a microprocessor-based control system. In FIG. 5, the rollers 24 have been moved along the first guide track 26 to position B, while rollers 28 have been simultaneously moved along section 32 of the second guide track 30 to position E. In FIG. 6, the rollers 28 have traveled along section 34 of the second guide track 30 from position E to position F, rotating the panel around point B. Next, in FIG. 7, rollers 24 have been returned to position A, while rollers 28 simultaneously moved along section 36 of guide track 30 from position F to position G. Finally, in FIG. 8, rollers 28 have been moved along section 38 to position H rotating the panel around point A until it is fully reversed, at which point the latches are engaged with the stores on surface 18 now being in the launch position outside the aircraft. The panel 18 may be returned to the closed position by reversing the steps described above.

A variety of different drive systems could be used, depending on the type of aircraft power available (electric or hydraulic), size of panel, aircraft structure and space available. The drive system components would be controlled and coordinated by a system utilizing position feedback from the actuators. For example, drive systems for axis 22 could be hydraulic cylinders or electrocmechanical linear actuators acting along guide slots 26. Alternatively, hydraulic or electric rotary actuators coaxial with axis 22 may drive gears which engage racks which are parallel to guide slots 26 for lateral movement of axis 22, and rotate the panel 18 about axis 22. There may also be no drive system for lateral movement, with rollers 24 moving as a result of rollers 28 being driven around guide tracks 30. Latches would be necessary to hold rollers 24 at each end of slots 26 during the periods when rollers 24 are acting as fixed pivot points.

Likewise, drive systems for axis 29 could be hydraulic cylinders or electromechanical linear actuators, two for each end of axis 29, positioned so as to provide driving force throughout the path of rollers 28. Alternatively, hydraulic or electric rotary actuators coaxial with axis 29 may drive gears which engage racks which follow guide slot 30. Further, hydraulic or electric rotary actuators coaxial with axis 22 could drive the panel directly.

The control scheme should be optimized so that the panel 18 spends a minimum amount of time in transition between the stowed and deployed positions, as the open stores bay and partially rotated panel would create considerable aerodynamic drag, though no worse than systems presently in use. Tactical utilization of the system would involve transit to and from the target area with the panel in the stowed position, and deployment of the panel to the launch position while over the target. This not only eliminates the store/launcher drag and radar cross-section during transmit, but also eliminate the effect of an open bay, both of which allow longer range and more time on target.

It should be recognized that various combination of tracks and pivots may be used to optimize reversing panel operations for various aircraft and stores, and such variations are considered within the scope of the invention.

I claim:

1. A reversing panel assembly utilizable on an aircraft for the carriage and deployment of stores through an opening in the aircraft, comprising:
   a. a first guide track affixed to the aircraft;
   b. a second guide track affixed to the aircraft;
   c. a panel adapted to fit into the opening and having a first pivot axis coupled to the first guide track and a second pivot axis coupled to the second guide track;
   d. means for moving the first pivot axis along the first guide track; and e. means for moving the second pivot axis along the second guide track;

wherein the means for moving the first and second pivot axes work in combination to rotate the second pivot axis about the first pivot axis and reverse the orientation of the panel.

2. A reversing panel assembly according to claim 1, further comprising means for securing the panel to the aircraft in either orientation so as to maintain airframe structural integrity through the bay area.

3. A reversing panel according to claim 1, wherein the panel is longer than it is wide, said length being oriented longitudinally relative to the aircraft, and wherein the first pivot axis runs longitudinally through the center of the panel, and wherein the second pivot axis runs longitudinally through a first end of the panel.

4. A reversing panel according to claim 3, wherein the first guide track allows the first pivot axis to be laterally translatable between a first position and a second position, said first position being centrally located relative to the opening and said second position being distally located relative to the opening, and further wherein the second guide track defines a path that extends around the first guide track from one side of the opening to the other side of the opening.

5. A reversing panel according to claim 1, wherein the first guide track is substantially straight and parallel to an edge of the opening, and wherein the first pivot axis is longitudinally oriented and centrally located on the panel, such that the panel is movable between a first and second position on the first guide track, said first position being centrally located relative to the opening and said second position being distally located relative to the opening, and further wherein the second guide track defines a path that extends around the first guide track from one side of the opening to the other side of the opening.

6. A reversing panel according to claim 4, wherein the second guide track comprises:
   a. a first section proximate to the second position of the first guide track and tracing a first arc about the first position of the first pivot axis, said first arc subtending a first acute angle;
   b. a second section contiguous with the first section and extending substantially perpendicular to, and away from, the surface of the aircraft;
   c. a third section contiguous with the second section and tracing a second arc about the second position of the first pivot axis, said second arc subtending a second acute angle;
   d. a fourth section contiguous with the third section and extending along a tangent to the second arc, wherein the tangent forms a third acute angle with respect to the surface of the aircraft;
   e. a fifth section contiguous with the fourth section and tracing a third arc about the first position of the first pivot axis, said third arc subtending a fourth acute angle;

wherein the panel is caused to rotate as follows: the second pivot axis is urged along the first section toward the second section, then the second pivot axis is urged along the second section toward the third section simultaneously with the first pivot axis being urged toward its second position, then the second pivot axis is urged along the third section toward the fourth section, then the second pivot axis is urged along the fourth section simultaneously with the first pivot axis being urged back toward the first position, then the second pivot axis is urged along the fifth section to the surface of the aircraft.

7. A reversing panel according to claim 6, wherein said first acute angle is approximately twenty degrees.

8. A reversing panel according to claim 6, wherein said second acute angle is approximately forty degrees.

9. A reversing panel according to claim 6, wherein said third acute angle is approximately thirty degrees.

10. A reversing panel according to claim 6, wherein said fourth acute angle is approximately twenty degrees.

11. A reversing panel assembly utilizable in an aircraft for carriage and deployment of stores through an opening in the aircraft, comprising:
   a. A panel adapted to fit into the opening and having a first pivot axis and a second pivot axis, wherein the first pivot axis extends longitudinally through the center of the panel and the second pivot axis extends longitudinally through a distal location on the panel;
   b. A first guide track along which the first pivot axis is movable, said first guide track being substantially parallel and proximate to the surface of the aircraft, wherein the first pivot axis is movable between a first and second position on the first guide track, said first position being centrally located in the opening and said second position being distally located in the opening;
   c. a second guide track along which the second pivot axis is movable, comprising:
      i. a first section proximate to the second position of the first guide track and tracing a first arc about the first position of the first pivot axis, said first arc subtending a first acute angle;
      ii. a second section contiguous with the first section and extending substantially perpendicular to and away from the surface of the aircraft;
      iii. a third section contiguous with the second section and tracing a second arc about the second position of the first pivot axis, said second arc subtending a second acute angle;
      iv. a fourth section contiguous with the third section and extending along a tangent to the second arc, wherein the tangent forms a third acute angle with respect to the surface of the aircraft;
      v. a fifth section contiguous with the fourth section and tracing a third arc about the first position of the first pivot axis, said third arc subtending a fourth acute angle;
   d. means for moving the first pivot axis along the first guide track;
   e. means for moving the second pivot point along the second guide track; and
   f. means for securing the panel to the aircraft in either orientation.

wherein the panel is caused to rotate as follows: the second pivot axis is urged along the first section toward the second section, then the second pivot axis is urged along the second section toward the third section simultaneously with the first pivot axis being urged toward its second position, then the second pivot axis is urged along the third section toward the fourth section, then the second pivot axis is urged along the fourth section simultaneously with the first pivot axis being urged back toward the first position, then the second pivot axis is urged along the fifth section to the surface of the aircraft;

12. A reversing panel according to claim 11, wherein said first acute angle is approximately twenty degrees.

13. A reversing panel according to claim 11, wherein said second acute angle is approximately forty degrees.

14. A reversing panel according to claim 11, wherein said third acute angle is approximately thirty degrees.

15. A reversing according to claim 11, wherein said fourth acute angle is approximately twenty degrees.

* * * * *